(12) United States Patent
Takayama

(10) Patent No.: US 8,743,233 B2
(45) Date of Patent: Jun. 3, 2014

(54) SENSITIVITY-SETTABLE IMAGE CAPTURE APPARATUS

(75) Inventor: Masahiro Takayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 13/188,662

(22) Filed: Jul. 22, 2011

(65) Prior Publication Data

US 2011/0279704 A1    Nov. 17, 2011

Related U.S. Application Data

(62) Division of application No. 11/954,703, filed on Dec. 12, 2007, now Pat. No. 8,009,201.

(30) Foreign Application Priority Data

Dec. 22, 2006 (JP) ................... 2006-346656

(51) Int. Cl.
*H04N 5/235* (2006.01)
*H04N 9/73* (2006.01)
*H04N 9/00* (2006.01)

(52) U.S. Cl.
USPC ..................... 348/222.1; 348/223.1; 382/167

(58) Field of Classification Search
CPC  H04N 5/2355; H04N 5/23235; H04N 5/2356
USPC ............................. 348/222.1, 223.1; 382/167
See application file for complete search history.

(56) References Cited

U.S. PATENT DOCUMENTS

| | | | | |
|---|---|---|---|---|
| 7,453,496 B2 * | 11/2008 | Suzuki | | 348/221.1 |
| 7,508,421 B2 * | 3/2009 | Tamaru et al. | | 348/229.1 |
| 7,649,554 B2 * | 1/2010 | Suzuki | | 348/239 |
| 7,688,358 B2 * | 3/2010 | Miki et al. | | 348/223.1 |
| 2006/0291016 A1 * | 12/2006 | Ishigami et al. | | 358/518 |

FOREIGN PATENT DOCUMENTS

| JP | 08-280041 A | 10/1996 |
|---|---|---|
| JP | 2003-134531 A | 5/2003 |

* cited by examiner

*Primary Examiner* — Twyler Haskins
*Assistant Examiner* — Quang Le
(74) *Attorney, Agent, or Firm* — Cowan, Liebowitz & Latman, P.C.

(57) ABSTRACT

An image capture device includes an image pickup unit including a plurality of pixels and photoelectrically converting an object image by the plurality of pixels; a white balance control unit for performing a white balance correction processing on pixel signals from the image pickup unit; and a sensitivity changing unit for changing the sensitivity of photographing, wherein the white balance control unit performs the white balance correction processing such that, as the sensitivity increases, a response to the light source is suppressed.

4 Claims, 8 Drawing Sheets

SENSITIVITY-SETTABLE IMAGE CAPTURE APPARATUS

CROSS-REFERENCE TO RELATED APPLICATION

This application is a divisional of application Ser. No. 11/954,703, filed Dec. 12, 2007, the entire disclosure of which is hereby incorporated by reference.

BACKGROUND OF THE INVENTION

1. Field of the Invention

The present invention relates to white balance control techniques at the high sensitive image capture by an image capture apparatus such as a digital camera, a digital video camera and the like.

2. Description of the Related Art

Heretofore, in general, in the image capture apparatus such as a digital camera, a digital video camera and the like, to adjust color balance for light sources of different color temperatures, the photographed image signal is subjected to a white balance processing.

Here, an outline of the conventional white balance processing will be described.

First, the signal outputted from an image pickup device is digitalized by an A/D converter, and as shown in FIG. 2, is divided into a plurality of blocks. The signal of each block includes color signals including R (Red), G (Green), and B (Blue), and a color evaluation value of the block is calculated using the following formula (1), for example, $$Cx[i]=R[i]-B[i]/Y[i]\times 1024$$

$$Cy[i]=(R[i]+B[i]-2G[i])/Y[i]\times 1024 \quad (1)$$

(provided that $Y[i]=R[i]+2G[i]+B[i]$)

When a color evaluation value ($Cx[i]$, $Cy[i]$) falls within the white detection range set in advance, it is determined that the block is white, so that integral values sumR, sumG, sumB of the color pixels falling within the white detection range are calculated to calculate a white balance coefficient in accordance with the following formula (2) (Japanese Patent Application Laid-Open No. 2003-235050).

$$WBCo\_R=\text{sum}Y\times 1024/\text{sum}R$$

$$WBCo\_G=\text{sum}Y\times 1024/\text{sum}G \quad (2)$$

$$WBCo\_B=\text{sum}Y\times 1024/\text{sum}B$$

(provided that $\text{sum}Y=(\text{sum}R+2\times\text{sum}G+\text{sum}B)/4$)

Meantime, the digital camera currently available is designed such that its sensitivity can be changed over among a plurality of types such as ISO100, 200, 400, 800, and 1600 to be set. The larger these values are, the higher the sensitivity is, and photographing can be attained with a fewer amount of light, so that even when a shutter speed is fast, photographing can be made under an appropriate brightness. Under the circumstances such as a room and a night scene in which brightness is not sufficient, the shutter speed becomes automatically slow, but by increasing the sensitivity, the shutter speed can be increased.

However, as the sensitivity increase, the image ends up including many noise components, and this often causes an adverse effect of the rough image. Thus, under the present circumstances, the high sensitivity photographing enters the relationship of a tradeoff with the image Here, coming into a question in the white balance correction at the high sensitivity is the case where the sensitivity is relatively high such as ISO800, and 1600, and the case where a low color temperature light source such as tungsten and a day light light source is used as an object lighting source. In this case, when the white balance correction gains are compared, a B GAIN is applied at a higher level. As a result, a blue noise becomes conspicuous, so that the image quality remarkably deteriorates.

In Japanese Patent Application Laid-Open No. 2003-235050, a color temperature is estimated from the WB gain determined by the white balance calculation, and when the color temperature deviates from the standard range, a chroma emphasis is provided with a limiter. According to this method, while the white balance can be prevented from becoming unnatural to some extent, no consideration has been given to the relation between the white balance and sensitivity or the noise.

SUMMARY OF THE INVENTION

Consequently, it is an aspect of the invention to attain an appropriate white balance processing with reducing a color noise at the time of high sensitivity.

To achieve the aspect, one embodiment of the present invention provides an image capture apparatus, comprising an image pickup unit including a plurality of pixels and outputting pixel signals of one picture by photoelectrically converting an object image by the plurality of pixels; a sensitivity changing unit for changing the sensitivity of photographing; an operation unit for dividing the pixel signals of one picture into a plurality of blocks and calculating a color evaluation value to estimate a color of each of the plurality of blocks; a determining unit for determining whether the color evaluation value of each of the plurality of blocks fall within in the region determined as white on a color space; a white balance correction unit for performing a white balance correction processing on the pixel signals of one picture on the basis of the determination result of the determining unit; and a changing unit for changing the range of the region determined as white on the color space in accordance with the sensitivity.

Another embodiment of the present invention provides an image capture apparatus, comprising an image pickup unit including a plurality of pixels and photoelectrically converting an object image by the plurality of pixels; a white balance control unit for performing a white balance correction processing on pixel signals from the image pickup unit; and a sensitivity changing unit for changing the sensitivity of imaging, wherein the white balance control unit performs the white balance correction processing such that, as the sensitivity increases, a response to the light source is suppressed.

Another embodiment of the present invention provides a method for controlling an image capture apparatus including an image pickup unit including a plurality of pixels and outputting the pixel signals of one picture by photoelectrically converting an object image by the plurality of pixels; and a sensitivity changing unit for changing the sensitivity of photographing, the method comprising a calculating process for dividing the pixel signals of one picture into a plurality of blocks, and calculating a color evaluation value to estimate the color of each of the plurality of blocks; a determining process for determining whether the color evaluation value of each of the plurality of blocks falls within the region determined as white on a color space; a white balance correction process for performing a white balance correction processing on the image signals of one picture on the basis of the determination result in the determining process; and a changing process for changing the range of the region determined as white on the color space in accordance with the sensitivity.

Another embodiment of the present invention provides a method for controlling an image capture apparatus including an image pickup unit including a plurality of pixels and photoelectrically converting an object image by the plurality of pixels; and a sensitivity changing unit for changing the sensitivity of photographing, wherein a white balance control process for performing a white balance correction processing on pixel signals from the imaging unit is provided, and the white balance control process performs a white balance correction processing such that, as the sensitivity increases, a response to the light source is suppressed.

Further features of the present invention will become apparent from the following description of the exemplary embodiments with reference to the attached drawings.

DESCRIPTION OF THE EMBODIMENTS

Exemplary embodiments of the present invention will be described in detail below with reference to the accompanying drawings.

First Embodiment

Figure 1:
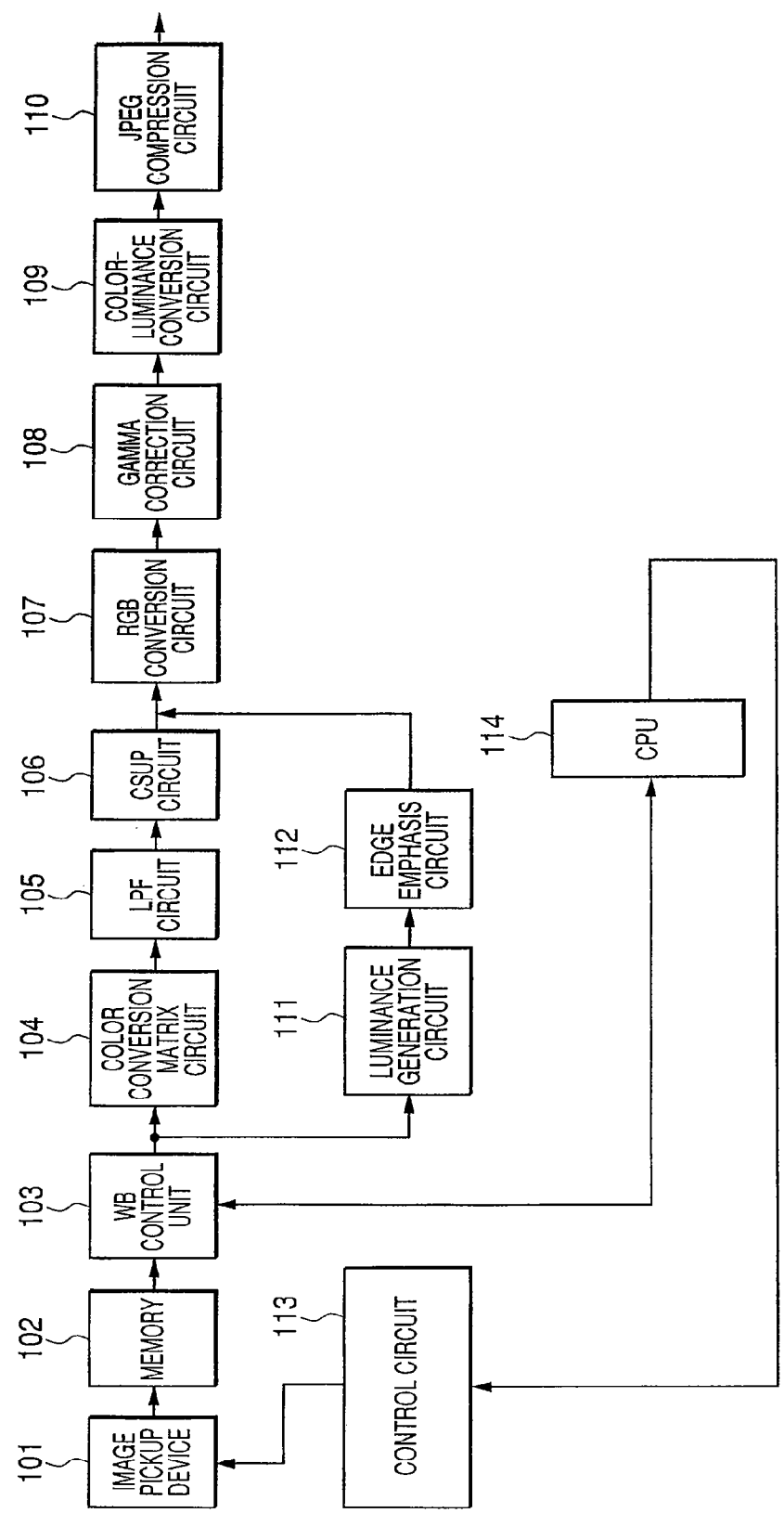
FIG. 1 is a block diagram showing the configuration of an image capture apparatus according to a first embodiment of the present invention.
Figure 2:
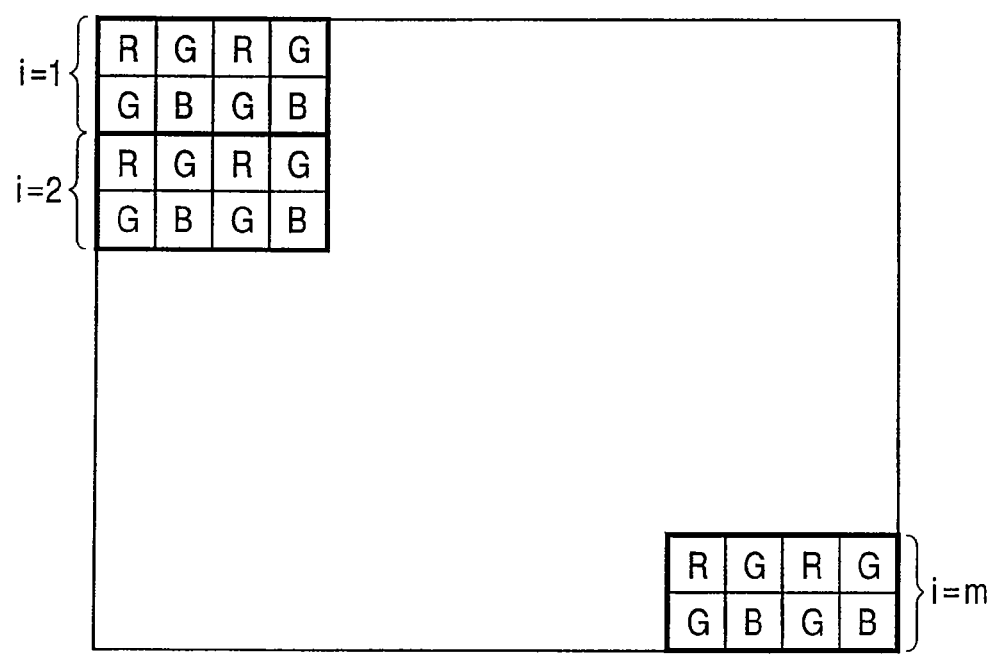
FIG. 2 is a view showing an example of dividing a picture into a plurality of blocks.

FIG. 1 is a block diagram showing the configuration of an image capture apparatus according to a first embodiment of the present invention.

In FIG. 1, a solid-state image pickup device 101 includes a CCD, a CMOS sensor, or the like, in which a plurality of pixels are two-dimensionally arranged to photoelectrically convert an object image and output pixel signals of one picture. The surface of the solid-state image pickup device 101, for example, is covered by a color filter including color elements of R (Red), G (Green), and B (Blue), regularly arrayed as a Bayer array, so that color photographing can be attained.

A CPU 114 calculates a shutter speed and an aperture value so that the whole image has an appropriate brightness, and at the same time, calculates a driving amount of a focus lens to bring an object image in a focus detection region into focus. The exposure value (shutter speed and aperture value) and the driving amount of the focus lens, which are calculated by the CPU 114, are sent to a control circuit 113, and based on each value, the exposure control and the focus control are performed.

A white balance (WB) control unit 103 calculates a WB correction value based on the information from the image signal stored in a memory 102, and by using the calculated WB correction value, performs a WB correction on the image signal stored in the memory 102. Incidentally, a detailed configuration of this white balance control unit 103 and the calculation method of the WB correction value will be described later.

A color conversion matrix circuit 104 converts the image signal subjected to the WB correction by the WB control unit 103 into color difference signals R-Y and B-Y by applying a color gain so as to be reproduced in an appropriate color.

A low-pass filter (LPF) 105 restricts the bands of the color differential signals R-Y and B-Y, and a CSUP (Chroma Suppress) circuit 106 suppresses a saturated false color signal included in the image signal the band of which is restricted by the LPF circuit 105.

On the other hand, the image signal subjected to the WB correction by the WB control unit 103 is also outputted to a luminance signal (Y) generating circuit 111, in which a luminance signal Y is generated, and the generated luminance signal Y is subjected to an edge emphasizing processing by an edge emphasizing circuit 112.

The color differential signals R-Y and B-Y outputted from the CSUP circuit 106 and the luminance signal Y outputted from the edge emphasizing circuit 112 are converted into RGB signals by a RGB conversion circuit 107, and are subjected to gradation correction in a gamma correction circuit 108. After that, the signals are converted into a YUV signal in a color luminance conversion circuit 109, compressed in a compression circuit 110, and then recorded as an image signal on an external memory medium or an internal memory medium.

The image capture apparatus shown in FIG. 1 is provided with a sensitivity selector switch (not shown) to change the sensitivity at the time of photographing. In the present embodiment, the gain for the pixel signals of one picture from the solid-state image pickup device is changed according to the switching of the sensitivity selector switch, so that the sensitivity at the time of photographing is changed.

Next, a method for calculating the WB correction value in the WB control unit 103 will be described by using the flowchart of FIG. 4.

First, the image signal stored in the memory 102 is read out, and the picture represented by the read-out image signal is divided into the optional number m of blocks (step S101). For every block i (i=1 to m), the pixel values are averaged to calculate a color average value (R[i], G[i], B[i]) for each color. By using the formula (1), the color evaluation values (Cx[i], Cy[i]) are calculated (step S102). That is, $$Cx[i]=(R[i]-B[i])/Y[i]\times1024$$

$$Cy[i]=(R[i]+B[i]-2G[i])/Y[i]\times1024 \quad (1)$$

(provided that Y[i]=R[i]+2G[i]+B[i])

Figure 3:
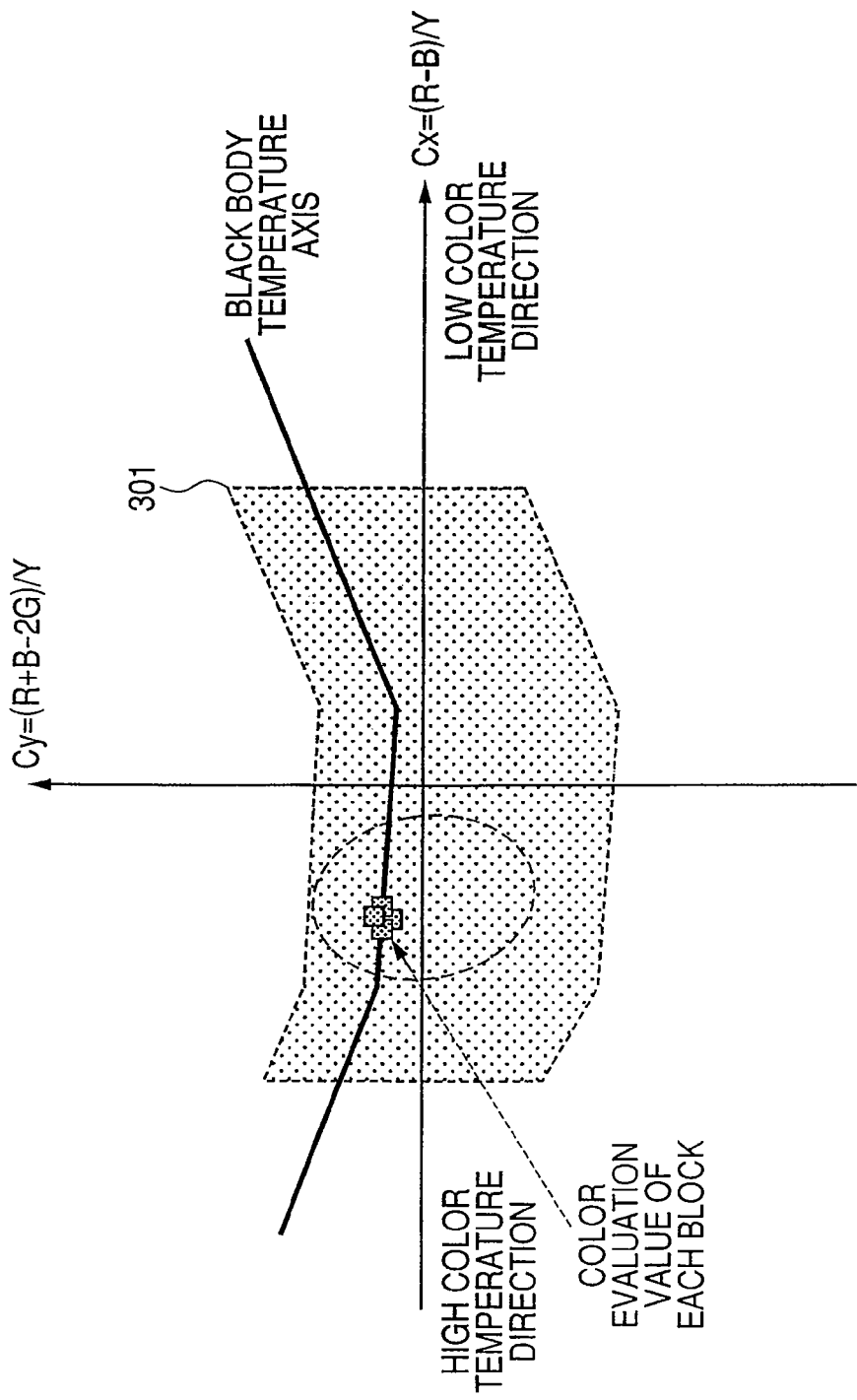
FIG. 3 is a view showing an example of a white determination result.

Next, it is determined whether the color evaluation value (Cx[i], Cy[i]) of the i-th block calculated in step S102 falls within the white detection range 301 set in advance in the color space shown in FIG. 3 (step S103).

The white detection range 301 plots the color evaluation values calculated by photographing in advance the white under different light sources in advance. The negative direction of an x coordinate (Cx) in FIG. 3 shows a color evaluation value provided when photographing the white of a high color temperature object, and the positive direction shows a color evaluation value provided when photographing the white of a low temperature object. The y coordinate (Cy) indicated a degree of the green component of the light source. As the G component progresses toward the negative direction, it becomes large. This means that it is a fluorescent lamp.

When the calculated color evaluation values (Cx[i], Cy[i]) fall within this white detection range 301, it is determined that that block is a white color (Yes at step S103), and the color average values (R[i], G[i], B[i]) of that block are integrated (step S104). When the color evaluation values (Cx[i], Cy[i]) do not fall within the white detection range 301, no addition is made, and the procedure advances to step S105.

The processings of steps S103 and S104 can be represented by the formula (3) as follows.

$$SumR = \sum_{i=0}^{m} Sw[i] \times R[i]$$

$$SumG = \sum_{i=0}^{m} Sw[i] \times G[i]$$

$$SumB = \sum_{i=0}^{m} Sw[i] \times B[i]$$

(3)

Here, in the formula (3), when the color evaluation values (Cx[i], Cy[i]) fall within the white detection range (301 of FIG. 3), Sw[i] is set to 1, and when do not fall, Sw[i] is set to 0. Based on this setting, whether the addition of the color evaluation values (R[i], G[i], B[i]) should be performed or not in accordance with the determination of step S103 is substantially attained.

At step S105, it is determined whether the above described processing has been performed on all the blocks i (i=1 to m). If the block not processed is still present, the procedure returns to step S102 to repeat the above described processing. If the processing for all the blocks is completed, the procedure advances to step S106.

At step S106, from the integral values (addition values) (sumR, sumG, sumB) of the obtained color evaluation values, the WB correction values (WBcol_R, WBcol_G, WBcol_B) are calculated by using the following formula (4).

$WBCol\_R = sumY \times 1024/sumR$ $WBCol\_G = sumY \times 1024/sumG$ (4)

$WBCol\_B = sumY \times 1024/sumB$ (provided that sumY=(sumR+2×sumG+sumB)/4)

By using the calculated WB correction values, the white balance correction is performed.

Next, a white balance variable response control will be described.

The method thereof is to obtain the sensitivity information at the time of photographing and make the white detection range variable based on that information.

Figure 5:
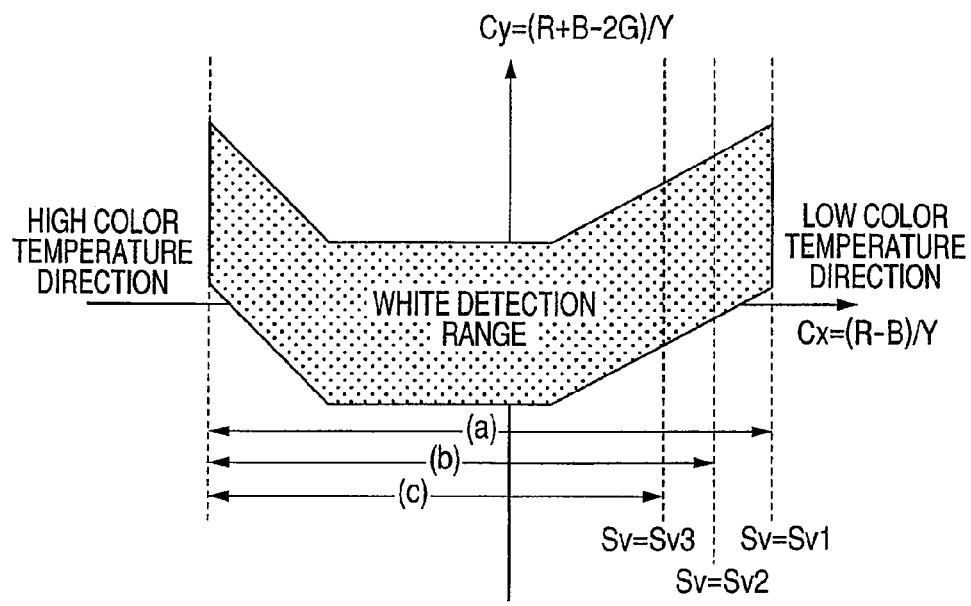
FIG. 5 is a view showing a white detection range variable according to sensitivity.

Specifically, as shown in FIG. 5, by changing the white detection range on the basis of the sensitivity information at the time of photographing, the color noise at the time of high sensitivity is suppressed. This change of the white detection range is performed by the WB control unit 103 based on the sensitivity information inputted from the CPU 114. FIG. 5 shows a state in which the white detection range in the low color temperature direction is made variable.

The detection range may be made variable in each of three directions, i.e., the low color temperature side (Cx direction), the high color temperature side (Cx direction), and the color component direction (Cy direction) which determines a degree of closeness to the color of the fluorescent lamp.

Figure 6:
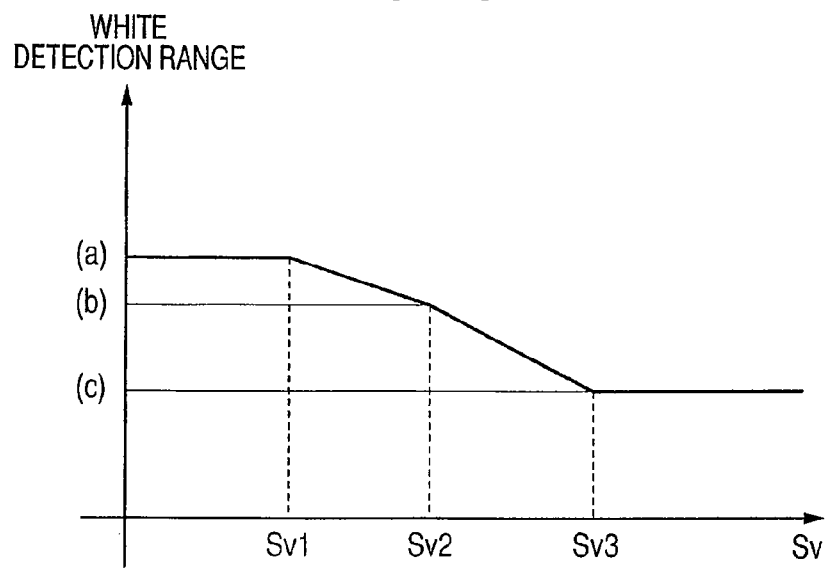
FIG. 6 is a flag showing variableness of the white detection range according to sensitivity.
Figure 7:
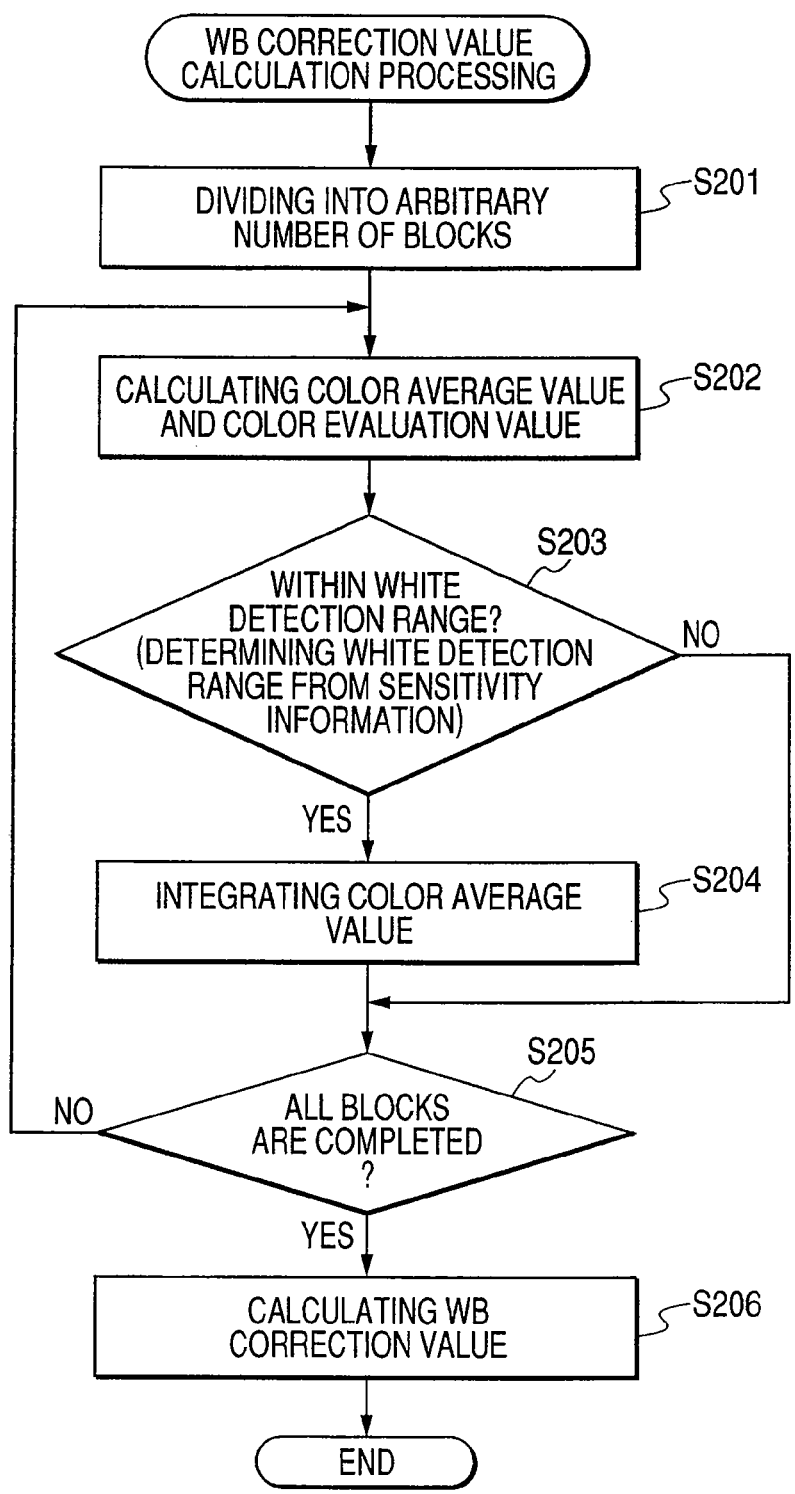
FIG. 7 is a flowchart showing the WB correction value calculation processing when changing the detection range by sensitivity.

To be more in detail, for example, as shown in FIG. 5, when the sensitivity Sv at the time of photographing is Sv≤Sv1 (low sensitivity time), it is decided as the white detection range of (a), and when Sv=Sv2 (intermediate sensitivity time), it is decided as the detection range of (b), and when Sv≤Sv3, it is decided as the detection range of (c). As shown in FIG. 6, when the sensitivity Sv is Sv1<Sv<Sv2, the ranges (a) and (b) are subjected to linear interpolation according to the sensitivity, and when the sensitivity Sv is Sv2<Sv<Sv3, the ranges (b) and (c) are subjected to linear interpolation according to the sensitivity so as to calculate the white detection range. As for the WB correction value calculation processing, as shown in FIG. 7 (particularly at step S203), the same processing as the flow shown in FIG. 4 is performed except that the white detection range is made variable according to the sensitivity.

As the sensitivity increases, the range of the low color temperature direction of the white detection range is narrowed, so that the range of the R (Red) direction of the white detection range is narrowed, and this can prevent the blue noise from becoming conspicuous by applying the B (Blue) gain small.

Second Embodiment

Figure 8:
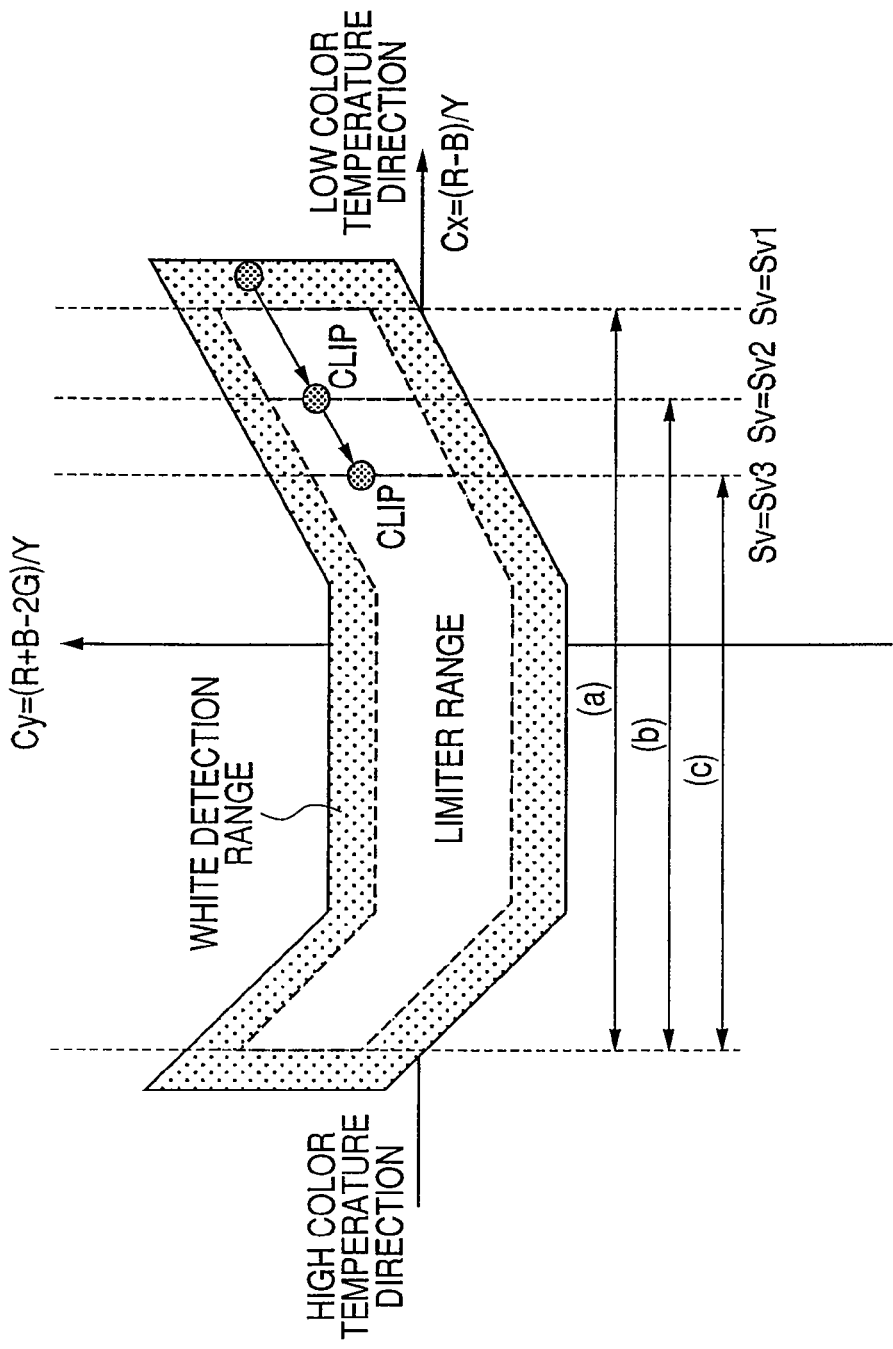
FIG. 8 is a view showing a limiter range made variable according to sensitivity.

While the first embodiment has made the white detection range variable according to the sensitivity, in this second embodiment, as shown in FIG. 8, a limiter range is changed according to the sensitivity, so that when an output of the white detection result is out of the limiter range, it is clipped to a limit value.

FIG. 8 also shows the case where a low color temperature direction only is made variable similarly to the first embodiment. The limiter range may be made variable in direction, i.e., a low color temperature side (Cx direction), a high color temperature side (Cx direction), and the color component direction (Cy direction) which determines a degree of the closeness to the color of a fluorescent lamp.

This operation will be described by using a flowchart of FIG. 9.

Figure 4:
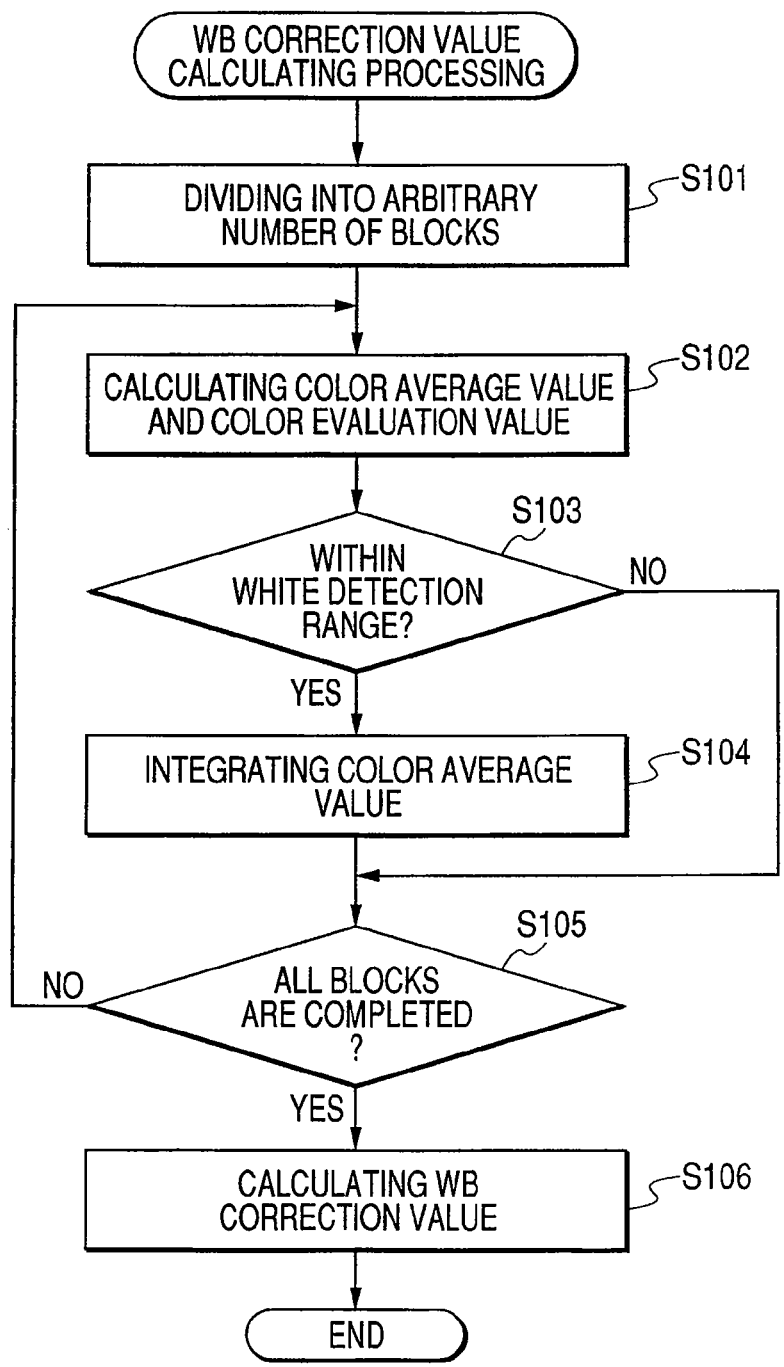
FIG. 4 is a flowchart showing a WB correction value calculating processing.

Since the same processing as in FIG. 4 is performed up to step S306, the detailed description thereof will be omitted.

Figure 9:
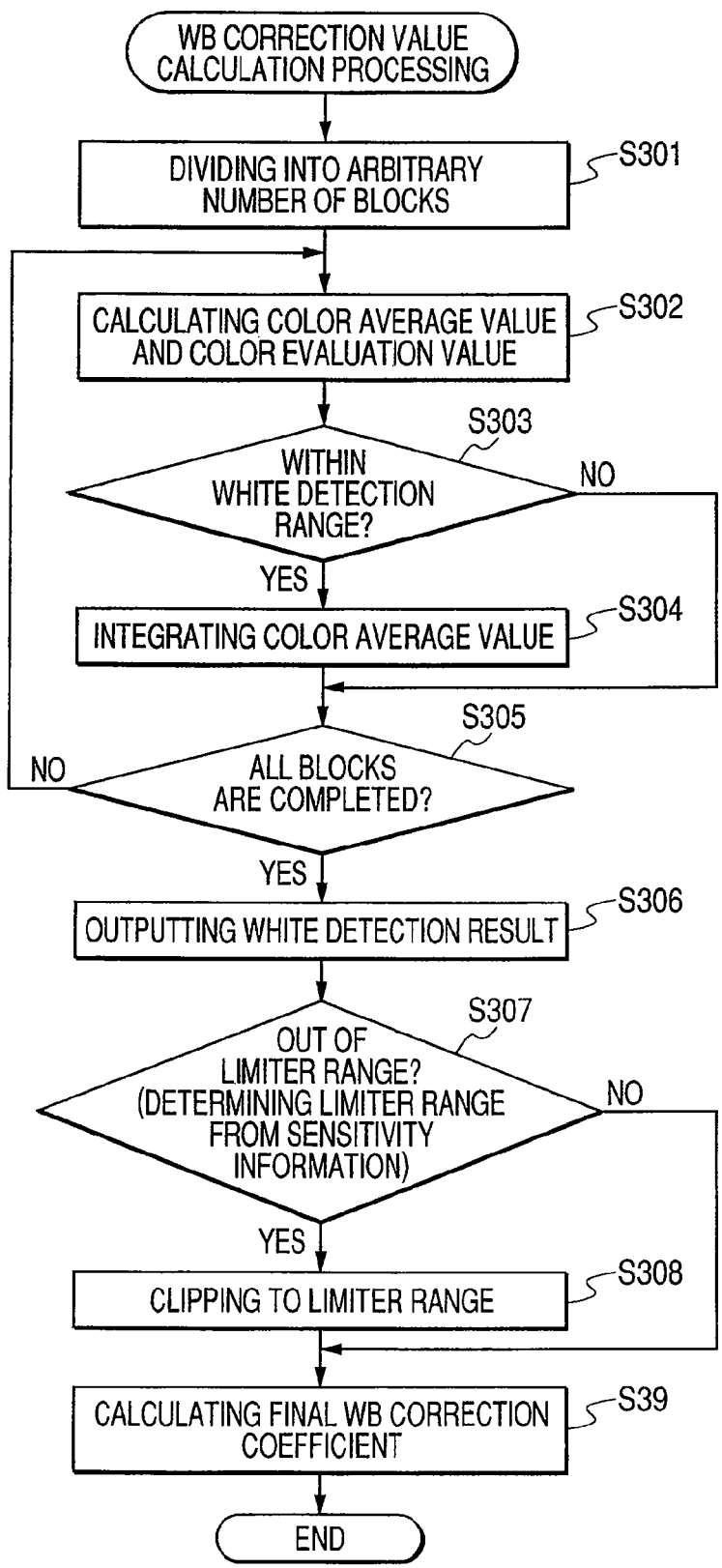
FIG. 9 is a flowchart showing the WB correction value calculation processing when changing the limiter range according to sensitivity.

When a white detection result outputted at step S306 is out of the limiter range, as shown in FIG. 9, it is clipped to the limiter range as shown in FIG. 9, (step S308), and then a final WB correction coefficient is calculated (step S309).

On the other hand, when the white detection result falls within the limiter range, the final WB correction coefficient is calculated based on the white detection result outputted at step S306 (step S309).

While, in the first and second embodiments, a unit for changing the range (specifically, white detection range and the limiter range) of the region determined as white on the color space, in accordance with the sensitivity has been described, another unit may be used.

For example, the range of the region determined as the white on the color space is not made variable according to the sensitivity, but the limiter of the white balance gain may be made variable according to the sensitivity.

That is, at the time of high sensitivity, the range of the region determined as the white on the color space or the limiter of the white balance gain may be made variable according to the sensitivity so that the white balance processing is performed such that the response to the light source is suppressed.

Another Embodiment

An object of each embodiment is achieved by the following method. That is, the memory medium (or the memory media) which records the program code of the software to realize the functions of the above described embodiments is provided to the system or the apparatus. The computer (or CPU or MPU) of the system or the apparatus reads and executes the program code stored in the memory medium. In this case, the program code per se read from the memory medium realizes the function of the embodiments, and the memory medium storing the program code includes the present invention. The execution of the program code read by the computer realizes not only the functions of the above described embodiments, but the present invention also includes the following case. That is, based on the instructions of the program code, the operating system (OS) and the like working on the computer performs a part or the whole of the actual processing, and according to that processing, the functions of the above described embodiments are realized.

The following case is also included in the present invention. That is, the program code read from the memory medium is written in the memory provided for a function expansion card inserted into the computer or a feature expansion unit connected to the computer. After that, based on that program code, the CPU and the like provided for the feature expansion card or the function expansion unit performs a part or the whole of the actual processing, and by that processing, the functions of the above described embodiments are realized.

When the present invention is applied to the memory medium, the memory medium is stored with the program code corresponding to the procedures as described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-346656, filed on Dec. 22, 2006 which is hereby incorporated by reference herein in its entirety.

What is claimed is:

1. An image capturing apparatus, comprising:
    an image pickup unit including a plurality of pixels configured to output pixel signals of one picture;
    a sensitivity changing unit configured to change a sensitivity of image capturing by the image pickup unit;
    an operation unit configured to calculate color evaluation values of a plurality of blocks in the picture output by the image pickup unit to estimate a color of each of the plurality of blocks;
    a determining unit configured to determine whether the color evaluation value of each of the plurality of blocks falls within a region determined as white on a color space;
    a white balance correction unit configured to perform a white balance correction processing on the pixel signals of one picture on the basis of a white extraction value obtained by the determination result of the determining unit; and
    a limiting unit configured to apply a limiter in accordance with the sensitivity to the white extraction value within the region determined as white.

2. A control method of an image capturing apparatus including an image pickup unit including a plurality of pixels and outputting pixel signals of one picture, comprising the steps of:
    changing the sensitivity of image capturing by the image pickup unit; calculating color evaluation values of a plurality of blocks in one picture to estimate a color of each of the plurality of blocks;
    determining whether the color evaluation value of each of the plurality of blocks falls within a region determined as white on a color space;
    performing a white balance correction processing on the pixel signals of one picture on the basis of a white extraction value obtained by the determination result in the determining step; and
    applying a limiter in accordance with the sensitivity to the white extraction value within the region determined as white.

3. A non-transitory computer-readable storage medium storing a computer program comprising a program code for causing a computer to function, in a control method of an image capturing apparatus including an image pickup unit including a plurality of pixels and outputting pixel signals of one picture, as:
    a sensitivity changing unit for changing the sensitivity of image capturing;
    an operation unit configured to calculate color evaluation values of a plurality of blocks in the picture output by the image pickup unit to estimate a color of each of the plurality of blocks;
    a determining unit configured to determine whether the color evaluation value of each of the plurality of blocks falls within a region determined as white on a color space;
    a white balance correction unit configured to perform a white balance correction processing on the pixel signals of one picture on the basis of a white extraction value obtained by the determination result of the determining unit; and
    a limiting unit configured to apply a limiter in accordance with the sensitivity to the white extraction value within the region determined as white.

4. The image capturing apparatus according to claim 1, wherein the white balance correction unit is configured to calculate the white extraction value by adding the color evaluation values determined within the region determined as white on the color space.

* * * * *